(12) United States Patent
Kundinger et al.

(10) Patent No.: US 8,127,083 B2
(45) Date of Patent: Feb. 28, 2012

(54) ELIMINATING SILENT STORE INVALIDATION PROPAGATION IN SHARED MEMORY CACHE COHERENCY PROTOCOLS

(75) Inventors: Christopher J. Kundinger, Rochester, MN (US); Nicholas D. Lindberg, Rochester, MN (US); Eric J. Stec, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1015 days.

(21) Appl. No.: 12/033,088

(22) Filed: Feb. 19, 2008

(65) Prior Publication Data
US 2009/0210633 A1 Aug. 20, 2009

(51) Int. Cl.
*G06F 12/00* (2006.01)
(52) U.S. Cl. .......... 711/141; 711/124; 712/217
(58) Field of Classification Search .......... 711/141
See application file for complete search history.

(56) References Cited

U.S. PATENT DOCUMENTS

2002/0124156 A1* 9/2002 Yoaz et al. ........... 712/225
2008/0052469 A1* 2/2008 Fontenot et al. ........... 711/133

OTHER PUBLICATIONS

Lepak et al.,"Temporally Silent Stores", 2002.*
Kevin M. Lepak et al., "Silent Stores for Free," University of Wisconsin, Madison, WI, http://www.ece.wisc.edu/~pharm/papers/micro2k_final.pdf.

* cited by examiner

*Primary Examiner* — Matthew Bradley
*Assistant Examiner* — Kalpit Parikh
(74) *Attorney, Agent, or Firm* — Joan Pennington

(57) ABSTRACT

A method and circuit for eliminating silent store invalidation propagation in shared memory cache coherency protocols, and a design structure on which the subject circuit resides are provided. A received data value is compared with a stored cache data value. When the received data value matches the stored cache data value, a first squash signal is generated. A received write address is compared with a reservation address. When the received write address matches the reservation address, a reservation signal is generated and inverted. The first squash signal and the inverted reservation signal are combined to selectively produce a silent store squash signal. The silent store squash signal cancels sending an invalidation signal.

18 Claims, 3 Drawing Sheets

ELIMINATING SILENT STORE INVALIDATION PROPAGATION IN SHARED MEMORY CACHE COHERENCY PROTOCOLS

FIELD OF THE INVENTION

The present invention relates generally to the data processing field, and more particularly, relates to a method and apparatus for eliminating silent store invalidation propagation in shared memory cache coherency protocols, and a design structure on which the subject circuit resides.

DESCRIPTION OF THE RELATED ART

Computers have become increasingly faster and one of the ways in which to increase the speed of computers is to minimize storage access time. In order to reduce data access time, special purpose high-speed memory spaces of static random access memory (RAM) called a cache are used to temporarily store data which are currently in use. For example, a processor cache typically is positioned near or integral with the processor. Data stored in the cache advantageously may be accessed by the processor, for example, in only one processor cycle retrieving the data necessary to continue processing; rather than having to stall and wait for the retrieval of data from a secondary slower memory or main memory.

Multiprocessing computer systems include multiple processors, each processor employed to perform computing tasks. A particular computing task may be performed upon one processor while other processors perform other unrelated computing tasks. Alternatively, components of a particular computing task are distributed among the multiple processors to decrease the time required to perform the computing task as a whole. One commercially available multiprocessing computer system is a symmetric multiprocessor (SMP) system. An SMP computer system typically includes multiple processors connected through a cache hierarchy to a shared bus. A memory connected to the shared bus is shared among the processors in the system.

In today's microprocessor systems, billions of loads and stores potentially occur every few seconds. Inevitably, some of these stores place the same data value to a memory location that already contains the exact same value. This is referred to as a silent store; that is to say that if location X in memory holds the value Y, and a store operation puts the same value Y to that memory location X, the store is considered silent.

These silent stores are inherently inefficient to any computer system, but multiprocessor systems have much more potential benefit from the removal of these stores than single processor systems.

In a multiprocessor system, cache coherency protocols enable keeping the copies of data in more than one cache coherent. The cache coherency protocols ensure that each cache contains the most up to date information. Such cache coherency is easily manageable for loads, but it becomes exceedingly more complex when stores are considered. A single write to a piece of data on one processor must be reflected in the caches of every other processor that holds a copy of that data.

Known solutions to the problem have all focused on trying to identify and eliminate silent stores from an instruction stream. This is extremely difficult to do, and has been shown to require a significant amount of overhead. Another approach is to precede every store operation with a load-and-compare, to see if the value being stored is already in that location. Again, this approach has obvious drawbacks of doubling the amount of required memory transactions.

A solution is required that does not require significant overhead, yet benefits from the effect of eliminating or "squashing" a silent store. This would help alleviate a lot of work in a multiprocessor system when one processor goes to store a value to a memory location that is shared amongst a non-trivial amount of other processors, but does not actually end up changing the value with its store. It has been shown that this happens quite often, and very frequently in particular for the value zero, where a zero is being written to a location where a zero exists. For example, a page is zeroed out when the page is brought in from main memory.

A need exists for an effective mechanism for eliminating silent store invalidation propagation in shared memory cache coherency protocols.

SUMMARY OF THE INVENTION

Principal aspects of the present invention are to provide a method and apparatus for eliminating silent store invalidation propagation in shared memory cache coherency protocols, and a design structure on which the subject circuit resides. Other important aspects of the present invention are to provide such method and apparatus for eliminating silent store invalidation propagation in shared memory cache coherency protocols substantially without negative effect and that overcome many of the disadvantages of prior art arrangements.

In brief, a method and circuit for eliminating silent store invalidation propagation in shared memory cache coherency protocols, and a design structure on which the subject circuit resides are provided. A received data value is compared with a stored cache data value. When the received data value matches the stored cache data value, a first squash signal is generated. A received write address is compared with a reservation address. When the received write address matches the reservation address, a reservation signal is generated and inverted. The first squash signal and the inverted reservation signal are combined to selectively produce a silent store squash signal. The silent store squash signal cancels sending an invalidation signal.

In accordance with features of the invention, the inverted reservation signal overrides the first squash signal to cancel the silent store squash signal when the write address matches the reservation address.

In accordance with features of the invention, the first squash signal is applied to an AND gate. The reservation signal is inverted and applied to the AND gate. The ANDed output provides the silent store squash signal only when the write address does not match the reservation address.

BRIEF DESCRIPTION OF THE DRAWINGS

The present invention together with the above and other objects and advantages may best be understood from the following detailed description of the preferred embodiments of the invention illustrated in the drawings, wherein:

Figure 3:
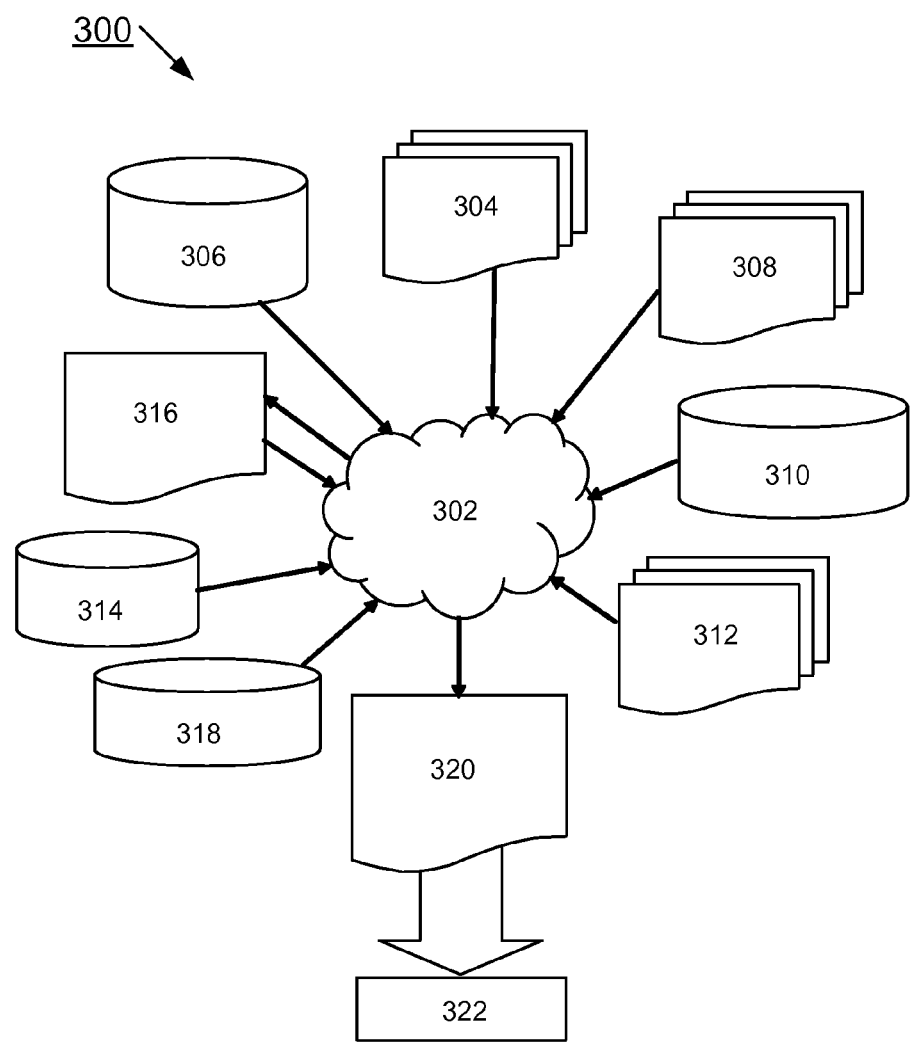

FIG. 1 is a schematic diagram representation illustrating an exemplary multiprocessor system for implementing silent store invalidation in shared memory cache coherency protocols in accordance with the preferred embodiment;

FIG. 2 is a schematic diagram representation illustrating an exemplary logic circuit for implementing silent store invalidation in shared memory cache coherency protocols in accordance with the preferred embodiment; and FIG. 3 is a flow diagram of a design process used in semiconductor design, manufacturing, and/or test in accordance with the preferred embodiment.

DETAILED DESCRIPTION OF THE PREFERRED EMBODIMENTS

In accordance with features of the invention, a method and circuit are provided to eliminate unnecessary invalidations caused by stores that do not change the state of the data in the cache. The method prevents one processor from invalidating other processor's shared cache lines if the store taking place is found to be silent. The optimization occurs at the hardware level, completely transparent to any software, which is an attractive feature. Also the overhead involved is minimal, providing an attractive optimization.

Figure 1:
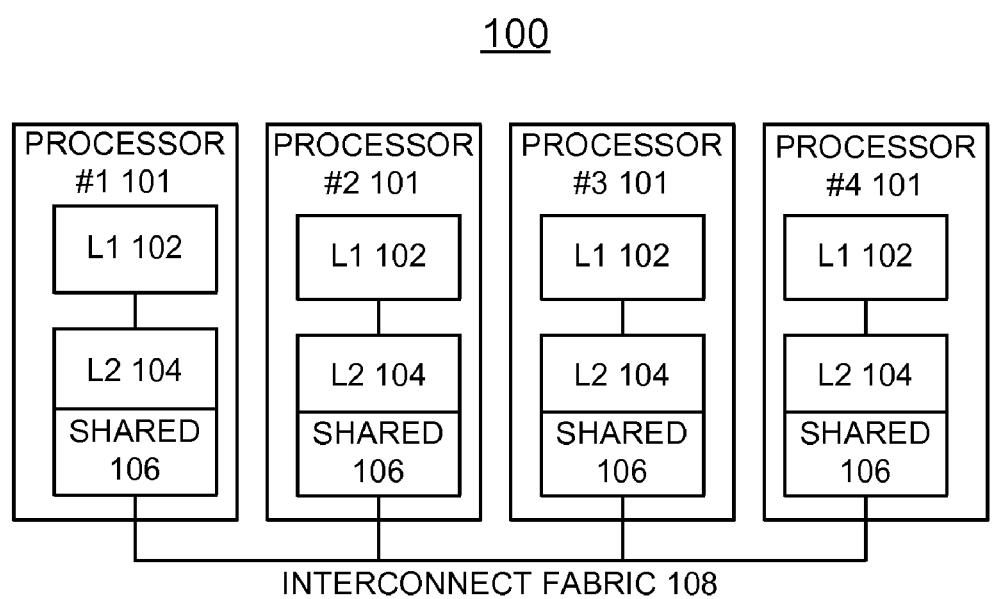

Having reference now to the drawings, in FIG. 1, there is shown an exemplary multiprocessor system for implementing silent store invalidation in shared memory cache coherency protocols generally designated by the reference character 100 in accordance with the preferred embodiment. Multiprocessor system 100 includes a plurality of processors #1-4, 101. Each of the processors #1-4, 101 includes an L1 cache 102, an L2 cache 104, and a shared line 106 connected to an interconnect fabric 108.

Multiprocessor system 100 is shown in simplified form sufficient for understanding the invention. It should be understood that the present invention is not limited to use with the illustrated multiprocessor system 100 of FIG. 1. For example, multiprocessor system 100 is not limited to the illustrated two levels of caches 102, 104 additional distributed caches could be used.

Figure 2:
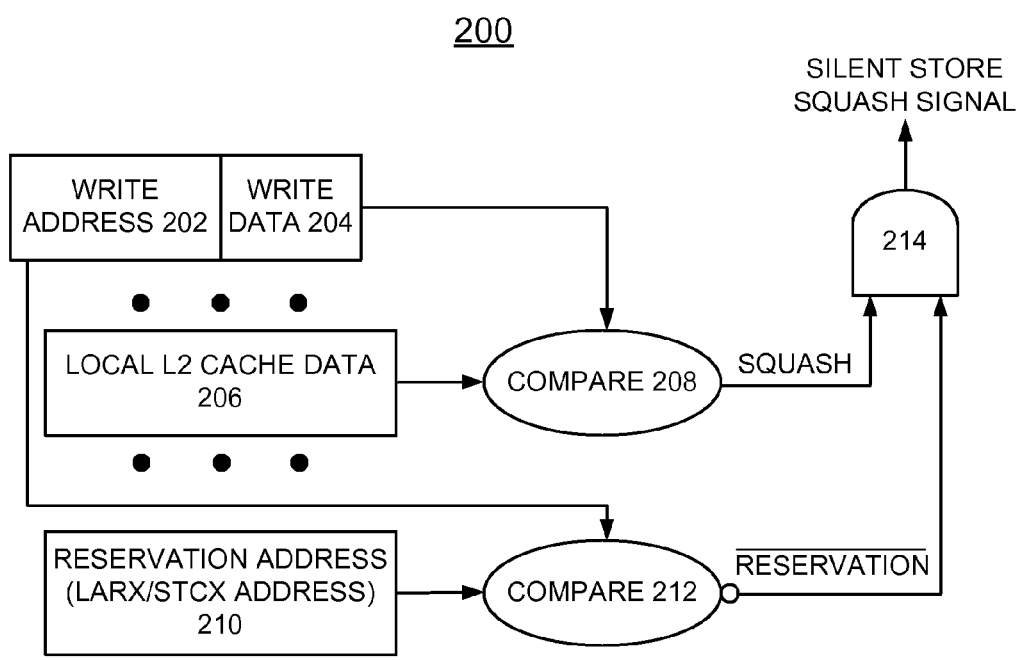

Referring also to FIG. 2, there is shown an exemplary logic circuit generally designated by the reference character 200 for implementing silent store invalidation in shared memory cache coherency protocols in accordance with the preferred embodiment. Logic circuit 200 includes a received write address 202 and a received write data value 204 that are received responsive to a cache hit. A stored cache data value 206 is stored in the local L2 cache 104 for the cache hit. The received write data value 294 is compared with the stored cache data value 206 by a compare 208. When the received data value matches the stored cache data value, a first squash signal is generated by the compare 208 indicated by SQUASH. A reservation address register 210 holds the address of the data that has the reservation, which typically is called the larx/stcx address. A received write address 202 is compared with the reservation address 210 by a compare/invert 212. When the received write address matches the reservation address 210, an inverted reservation signal is generated by the compare/invert 212 indicated by RESERVATION_bar. The first squash signal and the inverted reservation signal are combined by an AND gate 214 to selectively produce a silent store squash signal.

In accordance with features of the invention, the inverted reservation signal overrides the first squash signal to cancel the silent store squash signal. The squash signal is applied to a first input of the AND gate 214. The inverted reservation signal is applied to a second input of the AND gate 214. The ANDed output silent store squash signal indicated by SILENT STORE SQUASH SIGNAL is provided only when the write address does not match the reservation address.

In accordance with features of the invention, the silent store squash signal cancels sending an invalidation signal typically called a dclaim signal. The invalidation or dclaim signal is used for invalidating other copies of the cache line on other processors.

In prior art arrangements an invalidation or dclaim signal typically is send out onto the interconnect fabric without reading/writing/modifying the cache. This invalidation or dclaim signal has the effect of invalidating other copies of the cache line on other processors. For example, consider the required operations in a prior art implementation with two processors, A and B, with the same cache line X in each of their caches in a Shared state, and processor A wishes to write to line X, then in a traditional Modified Exclusive Shared Invalid (MESI) and MOESI cache coherency protocols as follows:

1) To write a value to memory, Processor A checks its cache and identifies a hit when the value to be written is loaded into its cache already.

2) Processor A sees that the cache hit for the particular cache line in the Shared state, and Processor A must send a signal out on the fabric to see if another processor has the cache line. Processor A then waits for an ACK signal, which signifies that Processor B has invalidated his copy of cache line X and Processor A is set to go forward.

3) Processor A then writes to cache line X and changes the state to Modified.

In accordance with features of the invention, with logic circuit 200 provided with the multiprocessor system 100, when a processor 101 is writing to local L2 cache 104, the compare 208 compares the value being written with the data 206 in the local L2 cache 104 in order to eliminate unnecessary invalidations caused by stores that do not change the state of the data in the cache. The silent store squash signal is generated to prevent a processor 101, such as, processor 101, #1 from invalidating shared cache lines of other processors 102, #2, #3, #4 when the store taking place is found to be silent. When the cache line is in a Modified or Exclusive state, then the compare 208 is ignored. When the cache line is in Shared state however, the match identified by compare 208 prevents the processor 101, #1 from sending out the dclaim signal, and operations continue as if store had gone through. Then the cache line is maintained in shared state until it is actually changed or invalided by another processor, and program behavior is conserved.

In accordance with features of the invention, with logic circuit 200 provided with the multiprocessor system 100 functionality of load reserve and store (larx/stcx) instructions are not adversely affected. When squashing a silent store, the larx/stcx atomicity is preserved by simultaneously comparing the reservation or larx/stcx address 210 with the write address 202. When the reservation or larx/stcx address 210 and the write address 202 match, this overrides the silent store squashing compare 208, so that the store goes on as normal. This ensures that larx/stcx program functionality is not violated. The output of the reservation larx/stcx compare is inverted, so that the silent store squash signal is generated only if the reservation address 210 does not match the current address 202. Thus, a reservation or larx/stcx address match cancels the silent store squash signal.

FIG. 3 shows a block diagram of an example design flow 300. Design flow 300 may vary depending on the type of IC being designed. For example, a design flow 300 for building an application specific IC (ASIC) may differ from a design flow 300 for designing a standard component. Design structure 302 is preferably an input to a design process 304 and may come from an IP provider, a core developer, or other design company or may be generated by the operator of the design flow, or from other sources. Design structure 302 comprises circuit 100, and circuit 200 in the form of schematics or HDL, a hardware-description language, for example, Verilog, VHDL, C, and the like. Design structure 302 may be contained on one or more machine readable medium. For example, design structure 302 may be a text file or a graphical representation of circuit 100, and circuit 200. Design process 304 preferably synthesizes, or translates, circuit 100, and circuit 200 into a netlist 306, where netlist 306 is, for example, a list of wires, transistors, logic gates, control circuits, I/O, models, etc. that describes the connections to other elements and circuits in an integrated circuit design and recorded on at least one of machine readable medium. This may be an iterative process in which netlist 306 is resynthesized one or more times depending on design specifications and parameters for the circuit.

Design process 304 may include using a variety of inputs; for example, inputs from library elements 308 which may house a set of commonly used elements, circuits, and devices, including models, layouts, and symbolic representations, for a given manufacturing technology, such as different technology nodes, 32 nm, 45 nm, 90 nm, and the like, design specifications 310, characterization data 312, verification data 314, design rules 316, and test data files 318, which may include test patterns and other testing information. Design process 304 may further include, for example, standard circuit design processes such as timing analysis, verification, design rule checking, place and route operations, and the like. One of ordinary skill in the art of integrated circuit design can appreciate the extent of possible electronic design automation tools and applications used in design process 304 without deviating from the scope and spirit of the invention. The design structure of the invention is not limited to any specific design flow.

Design process 304 preferably translates an embodiment of the invention as shown in FIGS. 1, and 2 along with any additional integrated circuit design or data (if applicable), into a second design structure 320. Design structure 320 resides on a storage medium in a data format used for the exchange of layout data of integrated circuits, for example, information stored in a GDSII (GDS2), GL1, OASIS, or any other suitable format for storing such design structures. Design structure 320 may comprise information such as, for example, test data files, design content files, manufacturing data, layout parameters, wires, levels of metal, vias, shapes, data for routing through the manufacturing line, and any other data required by a semiconductor manufacturer to produce an embodiment of the invention as shown in FIGS. 1 and 2. Design structure 320 may then proceed to a stage 322 where, for example, design structure 320 proceeds to tape-out, is released to manufacturing, is released to a mask house, is sent to another design house, is sent back to the customer, and the like.

While the present invention has been described with reference to the details of the embodiments of the invention shown in the drawing, these details are not intended to limit the scope of the invention as claimed in the appended claims.

What is claimed is:

1. A method for eliminating silent store invalidation propagation in shared memory cache coherency protocols comprising the steps of:
   comparing a received write data value with a stored cache data value;
   responsive to said received data value matching said stored cache data value, generating a first squash signal;
   comparing a received write address with a reservation address;
   responsive to said received write address matching said reservation address, generating and inverting a reservation signal; and
   combining said first squash signal and said inverted reservation signal to selectively produce a silent store squash signal; said silent store squash signal cancels sending an invalidation signal.

2. The method for eliminating silent store invalidation propagation in shared memory cache coherency protocols as recited in claim 1 wherein comparing said received write data value with said stored cache data value includes providing a hardware compare coupled to a write data register and a cache line of a local processor cache.

3. The method for eliminating silent store invalidation propagation in shared memory cache coherency protocols as recited in claim 1 wherein comparing said received write data value with said stored cache data value and comparing said received write address with said reservation address are simultaneously performed.

4. The method for eliminating silent store invalidation propagation in shared memory cache coherency protocols as recited in claim 1 wherein comparing said received write address with said reservation address includes providing a hardware compare invert coupled to a write address register and a reservation address register.

5. The method for eliminating silent store invalidation propagation in shared memory cache coherency protocols as recited in claim 1 wherein combining said first squash signal and said inverted reservation signal to selectively produce said silent store squash signal includes providing a two input AND gate; and applying said first squash signal to a first input of said AND gate and applying said inverted reservation signal to a second input of said AND gate.

6. The method for eliminating silent store invalidation propagation in shared memory cache coherency protocols as recited in claim 5 wherein an ANDed output of said AND gate provides said silent store squash signal only when said write address does not match said reservation address.

7. The method for eliminating silent store invalidation propagation in shared memory cache coherency protocols as recited in claim 1 wherein combining first squash signal and said inverted reservation signal to selectively produce said silent store squash signal includes not producing said silent store squash signal when said write address matches said reservation address.

8. A circuit for eliminating silent store invalidation propagation in shared memory cache coherency protocols comprising:
   a first compare comparing a received write data value with a stored cache data value; said first compare generating a first squash signal, responsive to said received data value matching said stored cache data value;
   a second compare invert comparing a received write address with a reservation address; said second compare invert generating and inverting a reservation signal, responsive to said received write address matching said reservation address; and
   an AND gate combining said first squash signal and said inverted reservation signal to selectively produce a silent store squash signal; said silent store squash signal cancels sending an invalidation signal.

9. The circuit for eliminating silent store invalidation propagation in shared memory cache coherency protocols as recited in claim 8 wherein an ANDed output of said AND gate produces said silent store squash signal only when said write address does not match said reservation address.

10. The circuit for eliminating silent store invalidation propagation in shared memory cache coherency protocols as recited in claim 8 wherein said first compare includes a hardware compare coupled to a write data register and a cache line of a local processor cache.

11. The circuit for eliminating silent store invalidation propagation in shared memory cache coherency protocols as recited in claim 8 wherein said compare invert includes a hardware compare invert coupled to a write address register and a reservation address register.

12. A design structure embodied in a non-transitory machine readable medium used in a design process, the design structure comprising:
   a circuit tangibly embodied in the non-transitory machine readable medium used in the design process, said circuit for eliminating silent store invalidation propagation in shared memory cache coherency protocols including;
   a first compare comparing a received write data value with a stored cache data value; said first compare generating a first squash signal, responsive to said received data value matching said stored cache data value;
   a second compare invert comparing a received write address with a reservation address; said second compare invert generating and inverting a reservation signal, responsive to said received write address matching said reservation address; and
   an AND gate combining said first squash signal and said inverted reservation signal to selectively produce a silent store squash signal; said silent store squash signal cancels sending an invalidation signal, wherein the design structure, when read and used in the manufacture of a semiconductor chip produces a chip comprising said circuit.

13. The design structure of claim 12, wherein the design structure comprises a netlist, which describes the circuit.

14. The design structure of claim 12, wherein the design structure resides on storage medium as a data format used for the exchange of layout data of integrated circuits.

15. The design structure of claim 12, wherein the design structure includes at least one of test data files, characterization data, verification data, or design specifications.

16. The design structure of claim 12, wherein an ANDed output of said AND gate produces said silent store squash signal only when said write address does not match said reservation address.

17. The design structure of claim 12, wherein said first compare includes a hardware compare coupled to a write data register and a cache line of a local processor cache.

18. The design structure of claim 12, wherein said compare invert includes a hardware compare invert coupled to a write address register and a reservation address register.

* * * * *